(12) United States Patent
Patitucci (10) Patent No.: US 7,844,904 B2
(45) Date of Patent: *Nov. 30, 2010

(54) SYSTEM FOR USE IN DATA EXCHANGE AND INFORMATION RETRIEVAL

(75) Inventor: Amy Patitucci, Phoenixville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/777,469

(22) Filed: Jul. 13, 2007

(65) Prior Publication Data

US 2008/0077884 A1     Mar. 27, 2008

Related U.S. Application Data

(63) Continuation of application No. 10/142,590, filed on May 9, 2002, now Pat. No. 7,266,775.

(51) Int. Cl.
G06F 15/177 (2006.01)
G06F 3/00 (2006.01)

(52) U.S. Cl. ...................... 715/735; 715/746

(58) Field of Classification Search ......... 709/230–233; 715/733–736, 746
See application file for complete search history.

(56) References Cited

U.S. PATENT DOCUMENTS 5,421,008 A     5/1995     Banning et al.
5,701,456 A     12/1997    Jacopi et al.
5,826,019 A  *  10/1998    Ronstrom .................... 709/201
5,844,554 A     12/1998    Geller et al.
RE36,444 E   *  12/1999    Sanchez-Frank et al. .... 715/839
6,038,558 A      3/2000    Powers et al.
6,094,648 A      7/2000    Aalbersberg
6,112,209 A      8/2000    Gusack
6,144,991 A     11/2000    England
6,246,410 B1     6/2001    Bergeron et al.
6,345,273 B1     2/2002    Cochran
6,647,389 B1 *  11/2003    Fitch et al. ...................... 1/1
6,691,159 B1     2/2004    Grewal et al.
7,035,862 B2     4/2006    Patitucci
2003/0210276 A1 11/2003    Patitucci

OTHER PUBLICATIONS

Google Search Engine Screen Captures, Nov. 10, 2001, Figures 1-10.

* cited by examiner

*Primary Examiner*—Weilun Lo
*Assistant Examiner*—Truc T Chuong
(74) *Attorney, Agent, or Firm*—Alexander J Burke (57) ABSTRACT

A user interface system employed in retrieving information from an information repository used in exchanging data between different electronic data systems includes the following method. A first menu is displayed which supports user selection of a bi-directional communication interface from a plurality of interfaces. The bi-directional communication interface is used for communicating data between a particular source and destination. In response to user selection of a bi-directional communication interface, a second menu is displayed which supports user entry of data determining communication characteristic information to be retrieved from said information repository for said selected communication interface.

13 Claims, 10 Drawing Sheets

| SEG NAME | SORT ID | ... |
|---|---|---|
| ALPHA | ALPHA | ... |

| FIELD SEG NAME | FIELD ID | SORT ID | ... |
|---|---|---|---|
| ALPHA | 2 | ALPHA*002 | ... |

| COMP SEG NAME | COMP FLD ID | COMP ID | SORT ID | ... |
|---|---|---|---|---|
| ALPHA | 2 | 3 | ALPHA*002*003 | ... |

| SUB COMP SEG NAME | SCM FLD ID | SCM CMP ID | SCM ID | SORT ID | ... |
|---|---|---|---|---|---|
| ALPHA | 2 | 3 | 1 | ALPHA*002*003*001 | ... |

FIG. 6d

DATA ELEMENT TABLE

| SORTING IDENTIFIER |
|---|
| ALPHA |
| ALPHA*001 |
| ALPHA*001*001 |
| ALPHA*001*001*001 |
| ALPHA*001*001*002 |
| ALPHA*001*002*001 |
| ALPHA*002 |
| ALPHA*002*001 |
| ⋮ |
| ALPHA*002*003 |
| ALPHA*002*003*001 |
| ⋮ |
| BRAVO |
| ⋮ |

INTERFACE NAME   INV CLIVPI ← 802

CONNECTION - PROPERTIES

TUESDAY, MARCH 29, 2001

PAGE 1 OF 2

| 804 | 806 | 808 |
|---|---|---|
| | SOURCE CONNECTION | DESTINATION CONNECTION |
| | I SUPERVPI IN | CLIVPI I OUT |
| PROPERTY NAME: | I_SUPERVPI_IN  810 | CLIVPI_I_OUT  812 |
| PROPERTY TYPE: | CON | CON |
| PROPERTY CLASS: | PRODUCTION | PRODUCTION |
| PROPERTY DESCRIPTION: | SUPER RECORD FOR VPI HOSPITAL | PRODUCTION OUTBOUND OBJECT |
| PROPERTY TEMPLATE: | OPL_CONNECTION_SNA | OPL_CONNECTION_TCPIP |
| PROPERTY CREATE DATE: | 1999-04-21 | 1999-07-01 |
| PROPERTY.MODIFY DATE: | 2000-2000-11-17 | 2000-2000-11-17 |
| PROPERTY.MODIFY USER: | OPL_USER | OPL_USER |
| PROPERTY.PAGER CODE: | 0 | 0 |
| PROPERTY SECURITY: | 1 | 1 |
| PROPERTY ICON: | | |
| PROPERTY OPL VERSION: | 22 | 22 |
| PROPERTY OPL RELEASE: | 9 | 9 |
| PROPERTY OPL UPDATE: | 20 | 20 |
| PROPERTY MODEL: | 0 | 0 |

| | | | |
|---|---|---|---|
| INTERFACE NAME | INV CLIVPI ←—1002 | PROTOCOL - TRANSPORT | 1007 |
| SOURCE CONNECT | I SUPERVPI IN ←—1004 | REPORT ON DESTINATION CONNECTION - TYPE | TCP IP |
| DES. CONNECT | CLIVPI 1 OUT ←—1006 | TUESDAY, MARCH 29, 2001 | |
| | | PAGE 1 OF 3 | |

| 1008 | 1010 |
|---|---|
| NAME | CLITCP_I_OUT ←—1012 |
| THANDLER_TYP | TRACOL |
| TRA_RESP_IND | IMMED |
| THDR_FLAG | 0 |
| THDR_DIR | BOTH |
| THDR_LENGTH | 512 |
| THDR_OFFSET | 0 |
| THDR_MSGTP_FG | 0 |
| THDR_MSGTP_OF | 0 |
| THDR_DTP_FG | 0 |
| THDR_DATMSG | |
| THDR_ATP_FG | 0 |
| THDR_ACKMSG | |
| THDR_NTP_FG | 0 |
| THDR_NAKMSG | |
| THDR_DATE_FG | 0 |
| THDR_DATE_LN | 25 |
| THDR_DATE_OF | 0 |
| THDR_TIME_FG | 0 |
| THDR_TIME_LN | 10 |
| THDR_TIME_OF | 0 |
| THDR_MSQ_FG | 0 |
| THDR_MSQ_TP | DECIMAL |
| THDR_MSQ_LN | |
| THDR_MSQ_OF | 0 |
| THDR_SSQ_FG | 0 |
| THDR_SSQ_TP | DECIMAL |

SYSTEM FOR USE IN DATA EXCHANGE AND INFORMATION RETRIEVAL

This is a continuation application of application Ser. No. 10/142,590 Filed on May 9, 2002 by Amy Patitucci.

FIELD OF THE INVENTION

The present invention relates to a method for retrieving information from an information repository, and in particular to a method for presenting information from the repository in a form more readable by humans.

BACKGROUND OF THE INVENTION

Use of computerized databases as information repositories has increased tremendously in the recent past. Such databases are used to store all sorts of information. In order for all the stored information to be useful, a user must be able to find desired information quickly and accurately and then that information must be displayed in a manner which is easily and completely understandable to the user. As the amount of information stored in databases has increased, the difficulty of finding and displaying desired information from among the stored information has also increased.

Finding desired information involves allowing a user to be able to enter a search criteria and have a computer system analyze the search criteria and the contents of the database to find information which satisfies the entered criteria without missing any information which satisfies the criteria and also without including any information which does not satisfy the criteria. This is not a simple problem. To solve this problem, much work has been done to derive processes to retrieve desired information from such databases.

Information stored in some databases is meant to be read by humans. Such information includes textual or graphical information related to all areas of human endeavor, such as informational articles, books, photographs, illustrations, stories, opinions etc. Other such information is numeric information related, for example, to demographics, statistics, scientific analysis, business management, etc. All of this information is of interest only to humans, and must be retrieved and displayed in human readable form. Display of information meant to be read by humans in a form readable by humans is seldom a problem. Instead, retrieval is the problem. The main problem of retrieval processes for this type of information is to properly interpret the search criteria entered by the user and to properly find only relevant information and reject irrelevant information. Much work has been done in this area. See, for example, U.S. Pat. No. 5,421,008 issued May 30, 1995 to Banning et al. and entitled SYSTEM FOR INTERACTIVE GRAPHICAL CONSTRUCTION OF A DATA BASE QUERY AND STORING OF THE QUERY OBJECT LINKS AS AN OBJECT; 5,701,456, issued Dec. 23, 1997 to Jacopi et al. and entitled SYSTEM AND METHOD FOR INTERACTIVELY FORMULATING DATABASE QUERIES USING GRAPHICAL REPRESENTATIONS; 6,094,648 issued Jul. 25, 2000 to Aalbersberg and entitled USER INTERFACE FOR DOCUMENT RETRIEVAL; 6,345,273 issued Feb. 5, 2002 to Cochran and entitled SEARCH SYSTEM HAVING USER-INTERFACE FOR SEARCHING ONLINE INFORMATION; and 6,026,388 issued Feb. 15, 2000 to Liddy et al. and entitled USER INTERFACE AND OTHER ENHANCEMENTS FOR NATURAL LANGUAGE INFORMATION RETRIEVAL SYSTEM AND METHOD.

However, information stored in other databases is used within equipment and systems, and especially within computer-controlled equipment and systems, to store information necessary to operate the equipment. Such information is not inherently of interest to humans, but instead contains, for example, data, characteristics, and/or parameters used for controlling the operation of the equipment. Nevertheless, it is still necessary for a human to interact with the database. For example, initial data and data for controlling a new operational mode of the equipment or system must be entered into the database. In this case, data must be requested from the user in human readable/writable form, and then converted to machine usable form and stored in the database. Further, it is sometimes necessary for a user such as a technician to analyze the data already existing in the database to either change an existing operational mode or to optimize the database itself. In this case, information in the database must be retrieved, converted from machine usable form into human readable form.

There are usually relationships among data stored in a database. That is, some data is especially related to each other. For example, some portion of the data and parameters can be described as a linear relationship, such as data defining and controlling input, process and output processes. Other data can be related to each other hierarchically. Still other data can be related to a common feature or characteristic. Yet other data can be related to mapping between different data elements. Analysis of such data by a technician would generally involve seeking and recognizing such relationships.

One example of such a database system is the OPENLink system produced by Siemens Medical Systems, Inc. The OPENLink system is an application for facilitating exchange of data among different electronic data systems. One electronic data system transmits data to the OPENLink system in a predetermined data format via a specific communications medium and protocol acceptable to the transmitting system. The OPENLink system, in turn relays this data to a second electronic data system. The second electronic data system receives the data in a predetermined data format via a specific communications medium and protocol acceptable by the receiving system. The data format, communications medium and protocol of the receiving system are not necessarily the same as those of the transmitting system.

The OPENLink System includes a database containing a plurality of around 60 data tables containing the data required to control the processing necessary to receive, transform (if required) and transmit data among electronic data systems. In the OPENLink system, the database information necessary to perform one data communications task, from one electronic data system to another, is termed an interface. The database contains information related to a plurality of interfaces, and typically contains thousands of pieces of information, stored in the data tables in a format appropriate to control the functioning of the OPENLink system, but not for human analysis.

The OPENLink system includes a toolkit application which is used to solicit information from a user related to a new interface. Information entered by the user defines the data formats, communications media and/or protocols for the new interface, and any data conversion necessary. The solicited information is then converted into internal machine usable form and stored in the tables in the database. This toolkit application may also be used to edit the information related to a single interface at a time. However, there is no corresponding tool for analyzing the current contents of this database.

Because the information stored in such databases is not inherently of interest to humans, it is usually formatted and stored in the database a manner which allows the most efficient operation of the equipment or system. This format is most likely not in a form easily readable by humans. This makes it difficult for a human to interact with the information already stored in the database. Work has been done to allow a human to easily query information in a database and display the retrieved information.

One method for extracting and displaying information from a database is to use the OPENLink toolkit application. Use of this application presents the information to the technician in a form which is coordinated with the use of that information in the OPENLink system. In addition, this application provides protection from inadvertently changing the data in the database. However, as described above, this permits inspection and editing of database information related to only limited portions of a single interface at a time, and therefore does not permit the user to see relationships among data related to a plurality of interfaces. Thus, in order for a technician to see overall relationships, information related to each individual interface must be accessed separately, making this a slow tedious job.

Another method for extracting and displaying information from a database is to use a general purpose database management program, such as Paradox, manufactured by Corel Corporation, or Access, manufactured by Microsoft Corporation. Such products can access tables in a database and create a datasheet or data table view of the tables. Alternatively, such products can be used to generate reports on the database tables using filters and relating information in different tables. The user may then look through the displayed forms, tables or reports to identify parameters and relationships within a table or among tables. However, using this method requires a high level of knowledge about the OPENLink system and the database management program. In addition, the general purpose database management systems access the actual tables in the OPENLink database system, making it possible for a user to inadvertently change data in the database tables. Even worse, such a change may be made without coordination with other related data in the database, which would be provided by the OPENLink toolkit application. While the latter problem may be solved by using a copy of the database, copies of the tables run the risk of becoming outdated if they are not timely synchronized. Finally, this technique does not show database information in context with the information's characteristics and relationships, stored in the database.

Further work has been performed to enhance the ability to extract and display information from a generic database. For example, U.S. Pat. No. 6,246,410, issued Jun. 12, 2001 to Bergeron et al. and entitled METHOD AND SYSTEM FOR DATABASE ACCESS discloses a system for extracting, displaying and either replacing or updating the contents of a database table. When first invoked, an existing table may be selected, and the fields in the selected table are displayed for a user, who can select fields of interest and even associate an icon with those fields. Then, in use, a palette containing the icons related to the selected fields is displayed, and the user may drag data to or from those icons to transfer data either to or from the database and/or to manipulate the data in the database table. This method is limited to a single table. It also does not show relationships among data in the same or different tables, nor the characteristics of the data. Also, this method accesses the active data in the table, making it possible for a user to inadvertently change the data.

U.S. Pat. No. 6,038,558, issued Mar. 14, 2000 to Powers et al. and entitled EXTENSIBLE DATABASE RETRIEVAL AND VIEWING ARCHITECTURE discloses a system for accessing information in a database according to a user produced plan. This plan can include retrieval, processing and storage steps. This patent further discloses a method for generating steps which may be incorporated into the plans. This system may be adapted to information in multiple tables in a database. However, this patent does not disclose any specific steps, and in particular, does not disclose any steps for determining relationships among the data in the database.

A system which can access information in a database which is not inherently meant for humans, which can derive and sort data in a database, which can identify relationships among data stored in the database, which can display the data and relationships in a manner easily understood by humans, and which is protected against inadvertent change of data in the database is desirable.

BRIEF SUMMARY OF THE INVENTION

In accordance with principles of the present invention a user interface system employed in retrieving information from an information repository used in exchanging data between different electronic data systems includes the following method. A first menu is displayed which supports user selection of a bi-directional communication interface from a plurality of interfaces. The bi-directional communication interface is used for communicating data between a particular source and destination. In response to user selection of a bi-directional communication interface, a second menu is displayed which supports user entry of data determining communication characteristic information to be retrieved from said information repository for said selected communication interface.

DETAILED DESCRIPTION OF THE INVENTION

Figure 1:
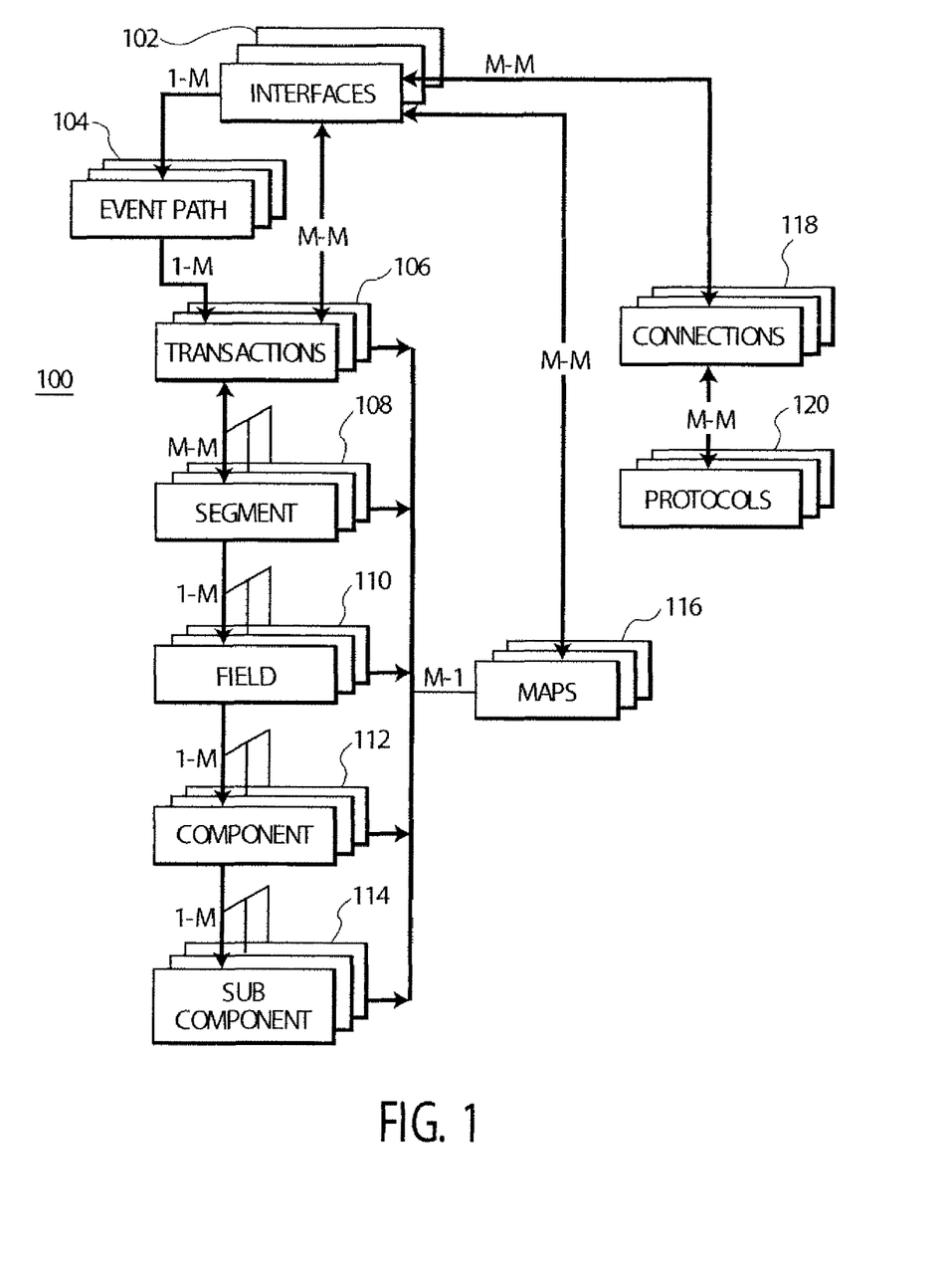
FIG. 1 is a diagram similar to an entity-relationship diagram illustrating various information stored in a database and showing relationships among the information.

FIG. 1 is a diagram similar to an entity-relationship diagram illustrating a portion of the information stored in an OPENLink system database 100 and showing information entities and relationships among the entities. One skilled in the art of database design and implementation will understand that the information in the database is stored in a plurality of tables, and that there is no inherent relationship among the tables, such as is illustrated in FIG. 1. These relationships are developed by the database designer when designing the structure of the database, and then imposed by access programs, such as the OPENLink toolkit application described above.

In FIG. 1, each rectangle, or set of rectangles, represents information defining or related to a common entity, each entity containing a plurality of entries, and each entry containing a plurality of data elements. Lines between entities represent relationships between the connected entities. An indicia '1-M' on a line indicates a one-to-many relationship, meaning that each entry in the originating entity can be related to multiple entries in the terminating entity; an indicia 'M-1' indicates a many-to-one relationship, meaning that multiple entries in the originating entity can be related to one entry in the terminating entity; and an indicia 'M-M' indicates a many-to-many relationship, meaning that each entry in the originating entity can be related to multiple entries in the terminating entity, and each entry in the terminating entity can be related to multiple entries in the original entity, all in a known manner.

As described above, the OPENLink database 100 contains information related to a plurality of interfaces 102. Each interface entry 102 contains, or ultimately is related to, all the information necessary to transfer data from one electronic data system to another electronic data system, as described above. Also as described above, each interface 102 comprises data related to receiving data from the first electronic data system in a predetermined data format, over a predetermined connection via a predetermined protocol, and transmitting that data to the second electronic data system in a second predetermined data format, over a second predetermined connection via a second predetermined protocol.

In FIG. 1, each interface entry 102 is related to one or more transaction entries 106, and each transaction entry 106 can be related to one or more interface entry 102. More specifically, each interface entry 102 is related to one source transaction entry 106 and one destination transaction entry 106. Each transaction entry 106, in turn, is related to data defining the data format of either the received data or the transmitted data, in a manner to be described in more detail below. Each interface entry 102 is also related to a single event path entry 104 and each event path entry 104 can be related to multiple interface entries 102. Each event path entry 104 can be related to multiple transaction entries 106. More specifically, the event path entry 104 contains information specifying which transaction entry 106 is the source transaction 106 for that interface entry 102 and which transaction entry 106 is the destination transaction entry 106 for the related interface 102 entry.

Each transaction entry 106 is related to one or more segment entries 108, and each segment entry 108 can be related to one or more transaction entries 106. Each segment entry is related to one or more field entries 110. Each field entry 110 is related to one or more component entries 112. Each component entry 112 is related to one or more sub component entries 114. The segment 108, field 110, component 112, and sub component 114 entries all relate to the data format of the related transaction entry 106, and are related in a hierarchical manner from the segment 108 at the highest level to the sub component 114 at the lowest level.

Each interface entry 102 is also related to one or more map entries 116, and each map entry 116 may be related to one or more interface entries 102. Each map entry 116 is also related to one or more entries in the respective transactions 106, segment 108, field 110, component 112 and sub component 114 entities. More specifically, one map entry 116 specifies the data format defining entries in the respective transactions 106, segment 108, field 110, component 112 and sub component 114 entities for the source transaction 106, and a second map entry 116 specifies the data format defining entries in the respective transactions 106, segment 108, field 110, compo-nent 112 and sub component 114 entities for the destination transaction 106. All of this related information is used to convert the data format from the transmitting system to the data format of the receiving system.

Each interface entry 102 is also related to one or more connection entries 118, and each connection entry 118 can be related to one or more interface entries 102. Each connection entry 118 is related to one or more protocol entries 120, and each protocol entry 120 may be related to one or more connection entries 118. The information contained in or pointed to by the connections entity 118 relates to the communications media. The information contained in or pointed to by the protocol entity 120 all relates to the protocol used to transmit data transmitted over the communications medium.

The present invention solicits instructions from a user related to the type of information desired, then extracts and analyzes data from the database, and displays the desired information in a manner easily understood by the user. The process of analysis and extraction includes not only the data in the database 100, but also the relationships among the data and the characteristics of the data, in a manner to be described below.

Figure 2:
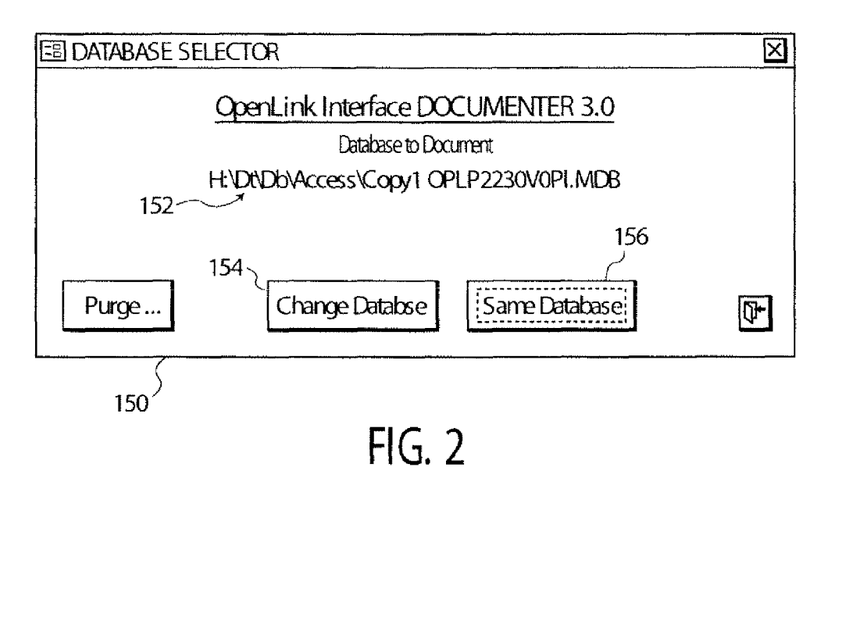
FIG. 2, FIG. 5, FIG. 8 and FIG. 10 are screen displays of dialog boxes generated according to the method of the present invention.

FIG. 2 is a screen display of a dialog box 150 generated by the method of the present invention. The dialog box 150 is displayed to permit a user to select a database file to document from among a plurality of database files available on the computer system. In dialog box 150, the name of the database file currently selected is displayed at location 152. A button 154, when clicked, allows a user to select a different database file from a known file open dialog box. The button 156, when clicked, begins the analysis and documentation of the selected database listed at location 152 in a manner to be described in more detail below.

Figure 3:
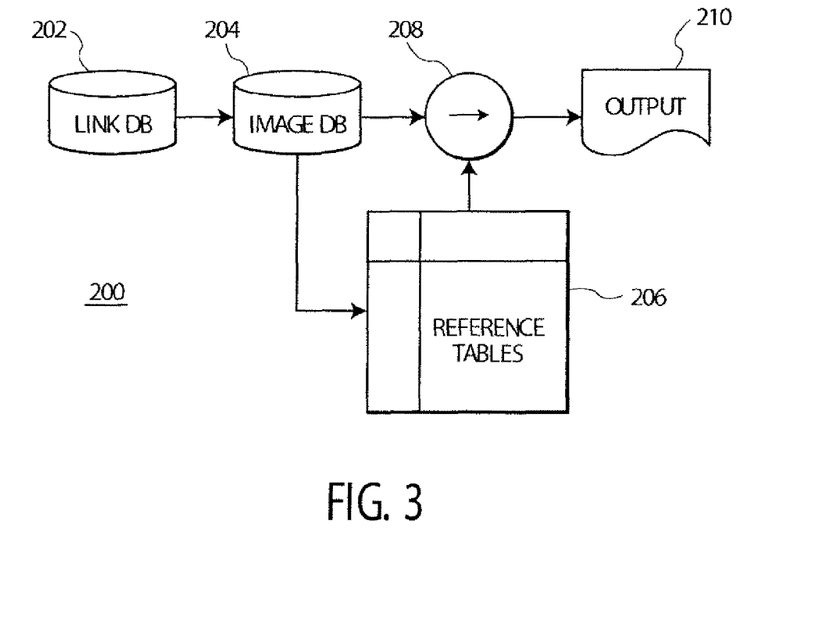
FIG. 3 is a data flow diagram illustrating an overview of the method of the present invention.

FIG. 3 is a data flow diagram illustrating an overview of the method 200 of the present invention. In FIG. 3, the OPEN-Link database 202 selected in the dialog box illustrated in FIG. 2 is actively coupled to a dynamically maintained image 204 of that database. This dynamically image 204 of the database 202 is not a copy, but an image for which all changes made to the database 202 by any means outside of the method of the present invention are automatically reflected in the image 204. However, any changes made by the method of the present invention are not reflected back to the original database 202. This protects the database from inadvertent changes while allowing the data display always to include the latest data.

The image database 204 is analyzed by the method of the present invention, in a manner to be described in more detail below, to generate reference tables 206. Information in these reference tables is then used to access further information in the database image 204, and the data in the reference tables 206 are combined 208 with the further information from the database image 204 to generate human readable output 210 for the user. The user output 210 may be in the form of a display of a data form, a data table, or a hierarchical directory listing on a display device, such as a computer monitor, or a print out on paper. The display may also be stored in digitized form in a file for future review and analysis by the user.

Figure 4:
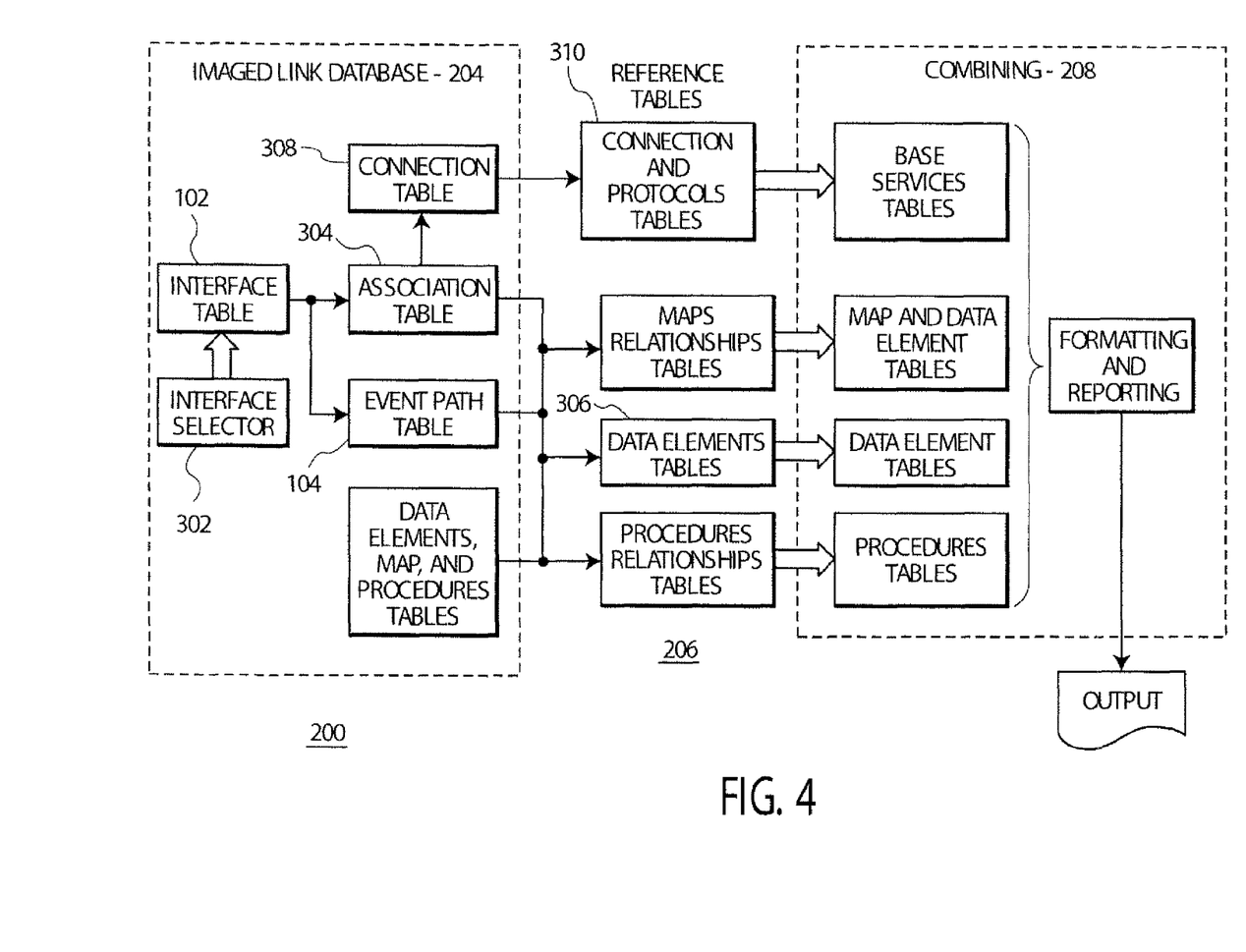
FIG. 4 is a more detailed data flow diagram illustrating details of the method of the present invention.
Figure 5:
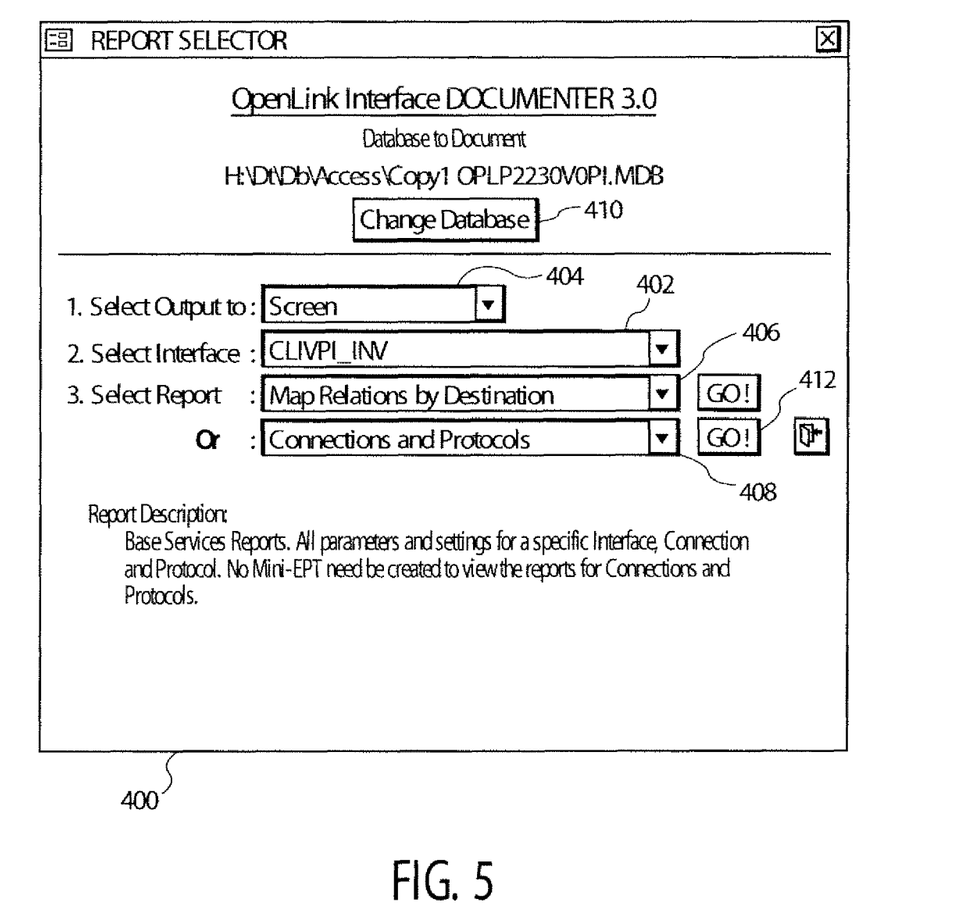

FIG. 4 is a more detailed block diagram illustrating details of the method 200 of the present invention. In FIG. 4, those steps which are the same as those illustrated in FIG. 3 are designated by the same reference number and are not described in detail below. In FIG. 4, in step 302, data is solicited from the user to select an interface entry 102 (of FIG. 1) from among the plurality of interface entries 102 in the interface table 102. FIG. 5 is a screen display of a dialog box 400 used for step 302. In FIG. 5, a text combo box 402 allows a user to specify a desired interface. The arrow at the right side of the combo box 402, when pressed, displays a list of all the interface entries 102 in the OPENLink database image 204. The user may select one of the interfaces 102 from this list, or type in the name of the desired interface 102 in the text portion of the combo box 402. The text combo box 404 solicits information from the user indicating where the results of the analysis are to be displayed and/or stored. The arrow to the right of the combo box 404 displays a list of possible destinations, and the user may select from that list. Text combo boxes 406 and 408 solicit user information related to the type of report desired. Respective arrows allow the user to select from lists of possible report types. A button 410 allows a user to select a different OPENLink database to analyze.

As described above, transaction entries 106 (of FIG. 1) have a many-to-many relationship with interface entries 102. Information in the event path table 104 contains the names of the inbound, or source, transaction entry 106, and the outbound or destination transaction entry 106 related to each interface entry 102. Two queries of the event path table 104 are executed: one to identify source transaction entries by interface; and one to identify destination transaction entries by interface. The results of these queries are saved for reference in later processing. Information in the association table 304 includes all information relating records from one table to corresponding records in another table. More specifically, the association table 304 contains data which relates segment entries 108 (of FIG. 1) to transaction entries 106. A query is executed on the association table 304 to list segments by transaction. This information is also saved for reference in later processing.

Because, as described above, the information in the segment 108, field 110, component 112 and sub component 114 tables are not inherently related, no information is stored anywhere giving their hierarchical relationship. One skilled in the art, referring to FIG. 1 will understand that each segment is a collection of fields, each field is a collection of components and each component is a collection of sub components. The method of the present invention analyzes the data in the database image 204 to determine the hierarchy implied by this arrangement. This is done by constructing an index based on the stored information representing the relationships between the segments 108, fields 110, components 112 and sub components 114.

FIG. 6 is a data storage diagram of information in a portion of the database image 204 illustrated in FIG. 3 and FIG. 4 useful in understanding the operation of the method of the present invention. FIG. 6a illustrates a portion of a segment table entry 108, FIG. 6b illustrates a portion of a field table entry 110, FIG. 6c illustrates a portion of a component table entry 112 and FIG. 6d illustrates a portion of sub component table entry 114. Only those portions of the table entries in FIG. 6a-d which are necessary to understand the present invention are illustrated. In FIG. 6, each entry is illustrated as a row. Each row consists of one or more columns each containing a data element in which the name of the data element is on top and the value of the data element is on the bottom. Although shown contiguously in a particular order at the beginning of the row in FIG. 6, one skilled in the art will understand that the illustrated columns may be located in the row at any location, in any order, and may have other columns (not shown) placed between them.

Figure 6A:
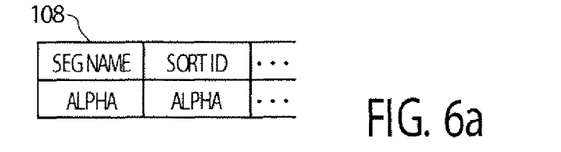
FIG. 6 is a data storage diagram of information in a portion of the database illustrated in FIG. 1 useful in understanding the operation of the method of the present invention.
Figure 6B:
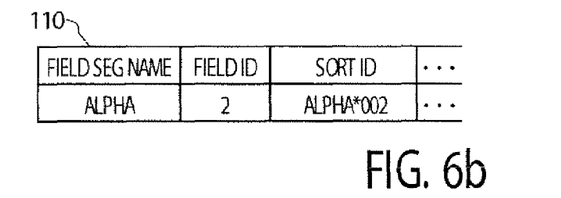
Figure 6C:
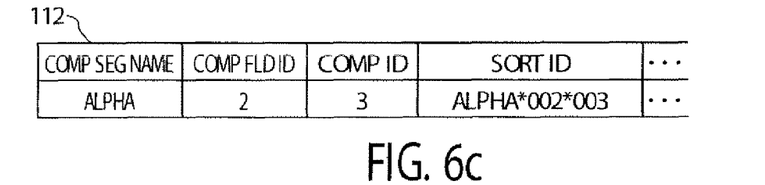
Figure 6D:
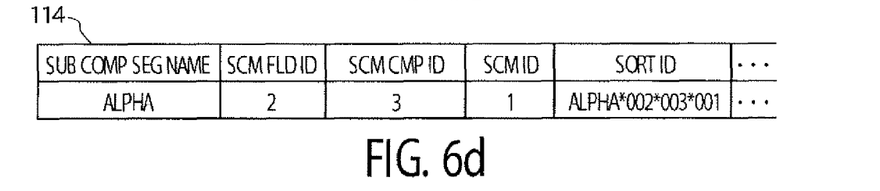
Figure 6E:
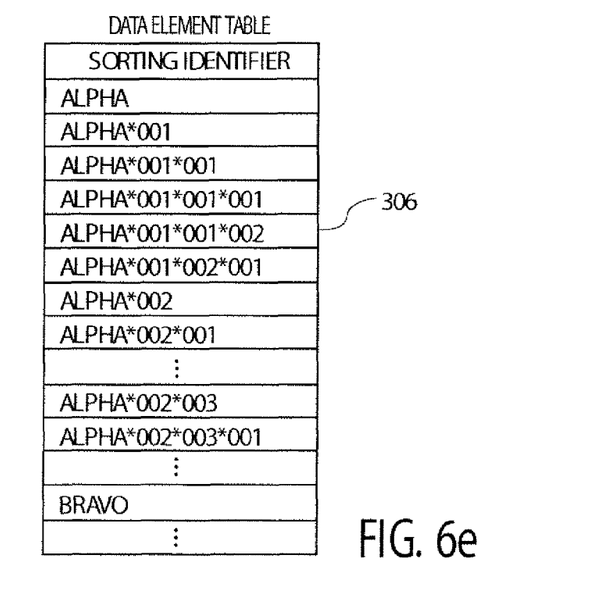

In FIG. 6a, the segment table entry 108 contains a "Seg Name" column which contains the name of the segment, "Alpha" which identifies this record. In FIG. 6b, the field table entry 110 contains a "Field seg name" column which contains the name of the segment to which this field belongs, "Alpha"; and also a "Field ID" column which contains a field identification (ID) number, "2", which indicates that this field is the second field in its segment. In FIG. 6c, the component table entry 112 contains a "Comp seg name" column which contains the name of the segment to which this component belongs, "Alpha"; a "Comp Fld ID" column which contains the ID number of the field to which this component belongs, "2"; and also a "Comp ID" column containing a component identification number, "3", which indicates that this component is the third component in its field. In FIG. 6d, the sub component table entry 114 contains a "Sub comp seg name" column which contains the name of the segment to which this sub component belongs, "Alpha"; a "Scm Fld ID" column which contains a field ID number, "2", which indicates the ID number of the field to which this sub component belongs; a "Scm Cmp ID" column which contains a component ID number, "3", which indicates the ID number of the component to which this sub component belongs; and also a "Scm ID" column which contains a sub component identification number, "1", which indicates that this sub component is the first sub component in its component. This arrangement is very efficient, and easily used by electronic equipment, but does not store information in a human readable form.

To generate a hierarchical listing of the entries in these tables, an index is created by forming unique sorting identifiers, or keys, for all the specified records in these tables, then merging the sorting identifiers into a new reference table, called the data elements table and sorting that table. First, each ID number in the respective tables is reformatted into a common format. More specifically, the ID numbers are reformatted into numbers having the same number of digits. Zeroes are prepended to pad any shorter numbers out to the desired number of digits. That is, if the desired number of digits is three, "2" is padded with prepended zeroes to make "002". One skilled in the art will understand that ID numbers referring to different tables may be padded to different numbers of digits. That is, the field ID numbers may be padded to three digits, while the component ID numbers and sub component ID numbers may be padded to two digits, for example.

Then a unique sorting identifier is generated for each entry in each table in the following manner. For the segment table entries 108, the sorting identifier is an indicator consisting of the segment name stored in the "Seg Name" column. For the field table entries 110, the sorting identifier is an indicator consisting of the concatenation of the field segment name in the "Field seg name" column and the padded field ID number in the "Field ID" column, separated by a "*" character. For the component table 112, the sorting identifier is an indicator consisting of the concatenation of the component segment name in the "Comp seg name" column, the padded component field ID number in the "Comp Fld ID" column, and the padded component ID number in the "Comp ID" column, all separated by "*" characters. For the sub component table 114, the sorting identifier is an indicator consisting of the concatenation of the sub component segment name in the "Sub Comp seg name" column, the padded component sub component field ID number in the "Scm Fld ID" column, the padded sub component ID number in the "Scm Cmp ID" column, and the sub component ID number in the "Scm ID" column, all separated by "*" characters.

More specifically, the sorting identifier for FIG. 6a is "Alpha", the sorting identifier for FIG. 6b is "Alpha*002", the sorting identifier for FIG. 6c is "Alpha*002*003", and the sorting identifier for FIG. 6d is "Alpha*002*003*001". All of the sorting identifiers are merged into a single entity, which may be a table, a file or a directory. In the illustrated embodiment, the sorting identifiers are merged into a table, called the data element table 306, illustrated in FIG. 6e. Then they are sorted alphanumerically. When these sorting identifiers are sorted alphanumerically, the associated entries in the respective tables represented by those sorting identifiers are automatically sorted into hierarchical order, as illustrated by the data elements table 306 in FIG. 6e. The data elements table 306 is one of the reference tables 206 illustrated in FIG. 3 and FIG. 4. The sorting identifiers are also stored in respective "Sort ID" columns, designated for the sorting identifier, in each of the segment entry 108 (FIG. 6a), field entry 110 (FIG. 6b), component entry 112 (FIG. 6c) and sub component entry 114 (FIG. 6d) in the image database 204. By storing the sorting identifiers in their associated entries, pointers may be generated which point to the associated entries in the corresponding data tables, thus enabling retrieval of other data elements, characteristics and parameters from the record pointed to.

Figure 7:
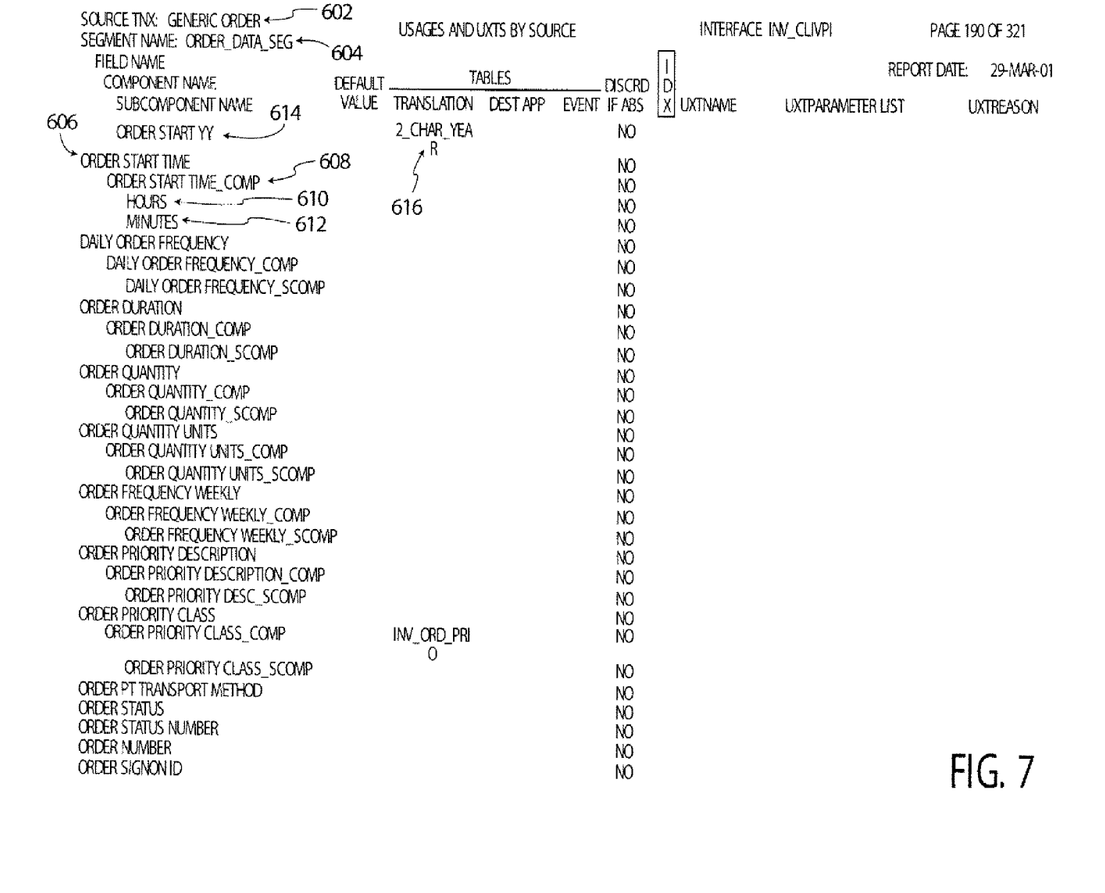
FIG. 7 is a diagram illustrating a portion of a display of information from the database in hierarchical form.

FIG. 7 is a diagram illustrating a portion of a display of information from the database in hierarchical form. As may be seen from FIG. 7, the display of hierarchical information is in order from top to bottom, with subordinate data indented to show its level. As may be seen at the left side of the heading, the source transaction is named "GENERIC ORDER" 602, and the segment name is "ORDER_DATA_SEG" 604. The remainder of the page is a list of field names, component names and sub component names, also as illustrated at the left side of the heading. More specifically, at the top of the list, a field 606 in the segment ORDER_DATA_SEG is ORDER START TIME. A component 608 of that field is ORDER START TIME_COMP. A first sub component 610 of that component is HOURS, and a second sub component 612 of that component is MINUTES. The remainder of the heading provides column headings for other information which may be found in the entries for the listed field, component and sub component. For example, the top most sub component 614, ORDER START YY, is related to the transaction table entry 2_CHAR_YEAR 616. Such a display allows a user to easily see the hierarchical relationships among all the data in the segment 106, field 108, component 110, and sub component 112 tables.

It is further possible to generate a display of information in the OPENLink database related by being in the same class of data elements in the OPENLink database all data elements of the same class are stored in a single table, regardless of what other information those data elements are related to. For example, all data elements containing information about characteristics of all fields in the database are stored in the fields table 110. Similarly, all data elements containing information about characteristics of all connections are stored in the connections table 118 and all data elements containing information about characteristics of all protocols are stored in the protocols table 120. Thus, to generate a list of all data elements of the same class, a listing of the information in the table containing information of that class may be extracted, sorted (if desired) and displayed.

It is also possible to generate a display of information from the OPENLink database related by being in an input-output relationship, for example, input and output connections and/or protocols. As described above with reference to FIG. 1, the interface table 104 is in a many-to-many relationship with the connections table 118. As described above with reference to FIG. 4, the association table 304 contains information for all associations in the database image 204. More specifically, the association table contains data relating each interface table entry 102 to a source connection entry 118 and to a destination connection entry 118. Two queries are performed on the association table: one for source connections by interface, and a second one for destination connections by interface. The results of these queries are stored for later reference.

Each entry in the connection table 118, in turn, is in a many-to-many relationship with the protocols table 120. That is, each connection may receive data in different protocols. In the illustrated embodiment, each connection is related to at least a primary and alternative protocol. The association table also contains data relating each entry in the connection table entry 118 to one or more protocols table entries 120. Two queries are performed on the association table: one for source protocols by connection and a second one for destination protocols by connection. The results of these queries are stored in the connections and protocols table 310, which is a part of the reference tables 206.

Figure 8:
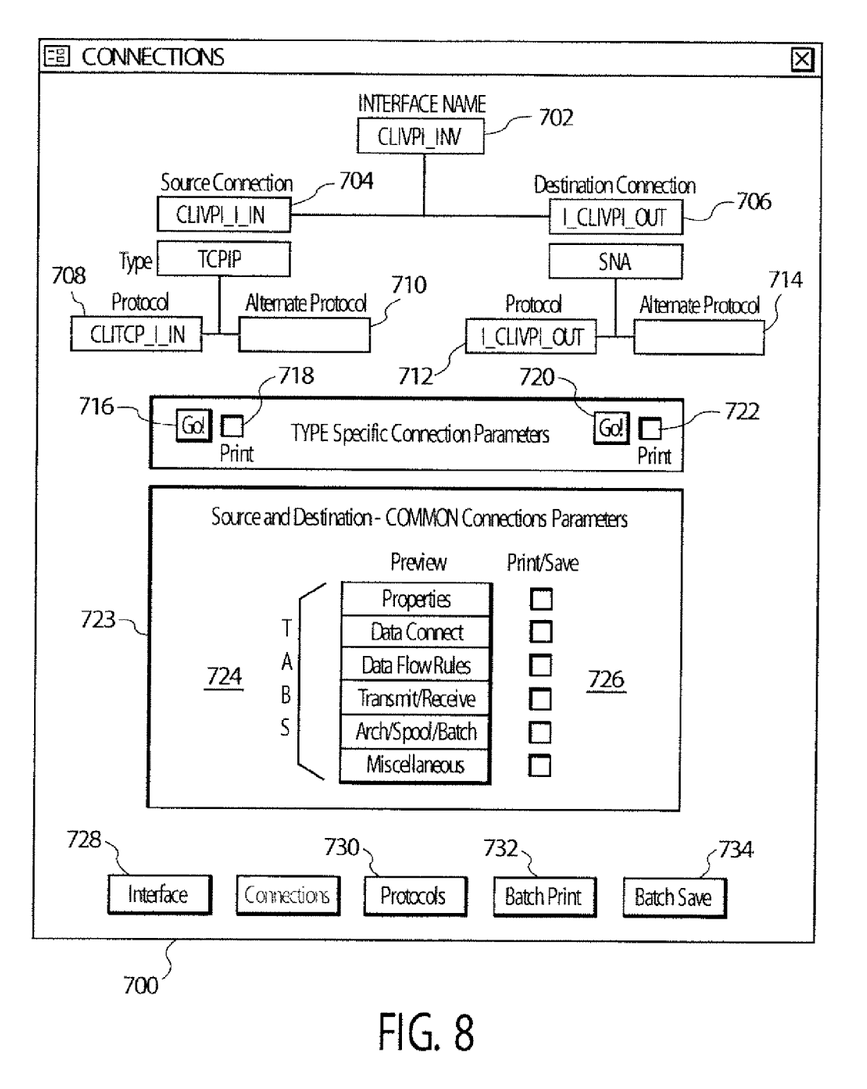

Referring again to FIG. 5 the user may request a report related to connections and protocols by clicking a "Go!" button 412 next to the dialog box 408 specifying the "Connections and Protocols" report. In response, source and destination connections information, and protocols information related to those connections, all related to the selected interface, is displayed. FIG. 8 is a screen display of a dialog box 700 displaying the currently selected interface 102 (of FIG. 1) in text box 702. The source and destination connection entries 118 for this interface are displayed in text boxes 704 and 706 respectively. In addition, the primary protocol and alternate protocol (if any) for both the source connection entry and destination connection entry are illustrated in text boxes 708, 710, 712 and 714. The source and destination connections and protocols are displayed side-by-side to illustrate their relationship.

Other controls on the dialog box 700 allow the user to find more information about the displayed connections and protocols. For example, source display button 716 and associated print check box 718, and destination display button 720 and associated print check box 722 allow the user to display or print the parameters of the associated connection. Tab buttons 724 and associated print/save check boxes 726 permit a user to display, print and/or save respective listings of further information, characteristics, and parameters related to the displayed connections. Interface button 728 permits the user to select a different interface, as illustrated in FIG. 5. Protocols button 730 permits the user to display information related to the displayed protocols in a manner to be described in more detail below. Batch print and batch save buttons 732 and 734 permit the user to print and save information in batch mode.

Figure 9:
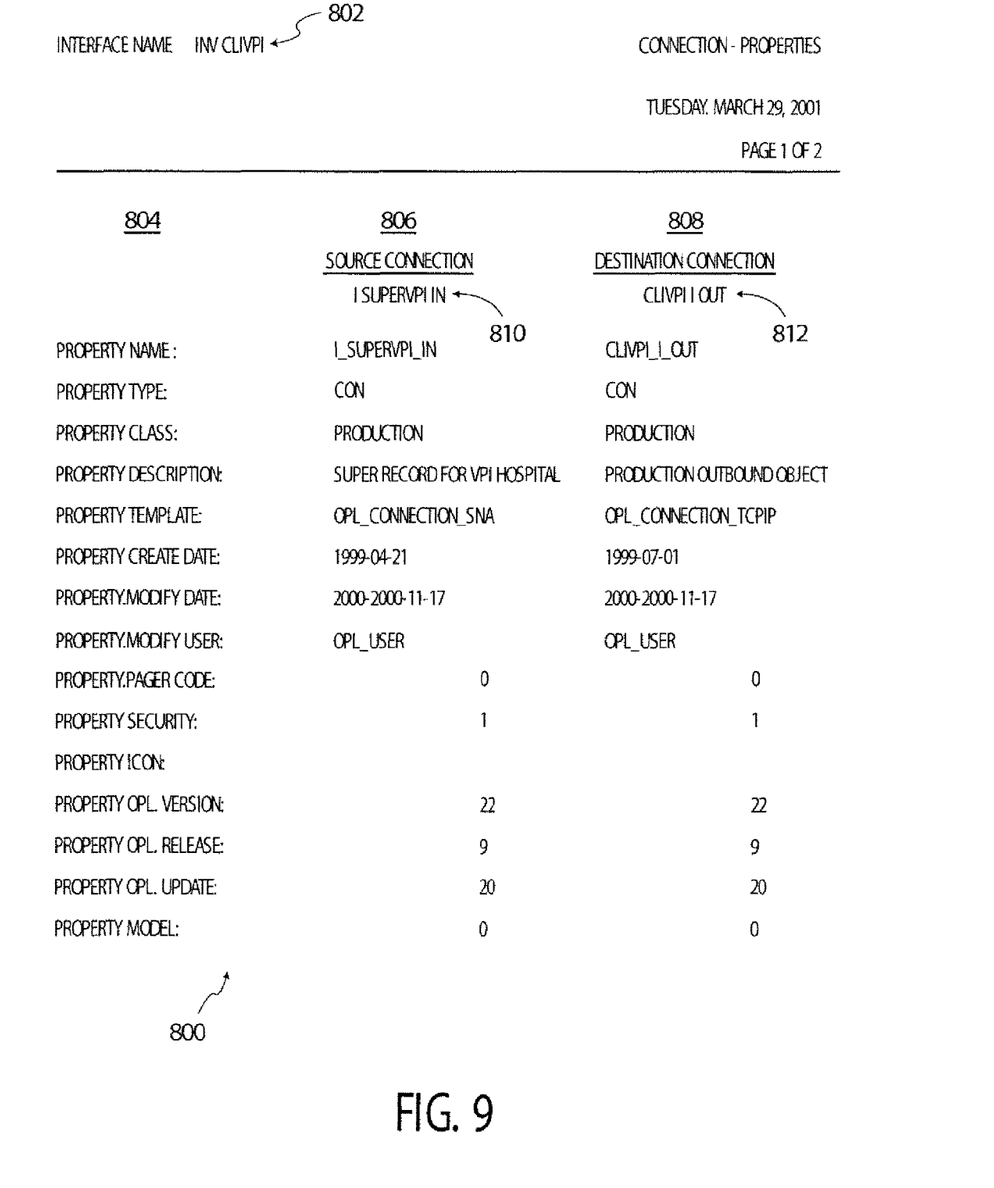
FIG. 9 and FIG. 11 are diagrams illustrating portions of a report of information related in an input-output form.

The user may request a display of properties of the related source and destination connections 118. FIG. 9 illustrates a display 800 of information relating the source and destination connections. In the heading, the name of the interface is listed 802. The left hand column 804 of FIG. 9 lists the property name, the middle column 806 lists the values of the properties for the source destination, and the right column 808 lists the values of the properties for the destination connection. At the top of the middle column 806 and right column 808 are the names of the source 810 and destination 812 connection entries.

Figure 10:
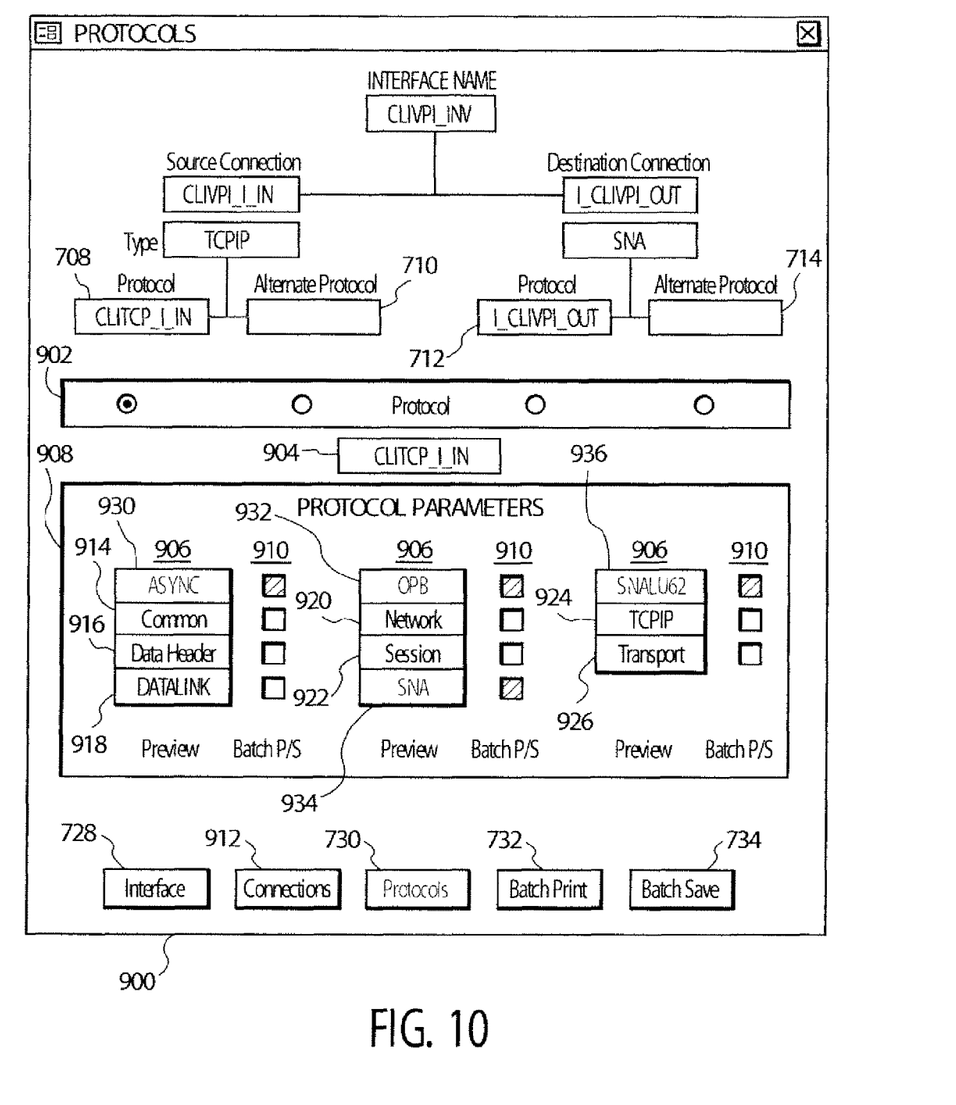

Referring again to FIG. 8 the user may request a report related to protocols by clicking the "Protocols" button 730. In response, protocol information related to the displayed connections is displayed. FIG. 10 is a screen display of a dialog box 900. Those elements which are the same in FIG. 10 as in FIG. 8 are designated by the same reference number and are not described in detail below. The upper portion of the dialog box 900 is the same as that illustrated in FIG. 8 The lower part includes controls for displaying information related to the displayed protocols. A radio button control 902 allows a user to select one of the displayed protocols. The name of the selected protocol is displayed in the text box 904.

Other controls on the dialog box 90 allow the user to retrieve more information from the database image 204 (of FIG. 3) about the displayed protocols. For example, the buttons 906 in the "Protocol parameters" section 908 allow a user to display, print and/or save classes of data, characteristics, and/or parameters related to the selected protocol. The corresponding check boxes 910 permit the user to mark selected classes of data, characteristics, and/or parameters to be printed or saved. Some of the classes of information represented by the respective buttons 906 will apply to the selected protocol and some classes of information will not.

More specifically, the "Common" button 914, when clicked, displays, or permits the user to print and/or save, information which applies to all protocols in common. The buttons 916 (Data Header), 918 (DATALINK), 920 (Network), 922 (Session), 924 (TCP/IP) and 926 (Transport) all represent respective classes of information which apply to the selected TCP/IP protocol. When one of these buttons is clicked, information related to the associated class of information for the selected protocol is displayed. For example, if the Network button 922 is clicked, information relating to network node information, task name information, user identification information, synchronous or asynchronous characteristic definition, etc. is displayed. Conversely, the buttons 930 (ASYNC), 932 (DPB), 934 (SNA) and 936 (SNALU62) do not apply to the selected TCP/IP protocol. This is represented on the dialog box 900 by the captions of those buttons being displayed in gray text, referred to as being "grayed out". When buttons are grayed out, the user is unable to be clicked. When the user selects a protocol using the radio buttons 902, those buttons which represent information not applicable to the selected protocol are grayed out.

The batch print button 732, when clicked, will condition the computer system to print a report listing the data, characteristics, and/or parameters whose corresponding check boxes 910 have been checked, and the batch save button 734, when clicked, will condition the computer system to save the selected data, characteristics, and/or parameters to a file.

Figure 11:
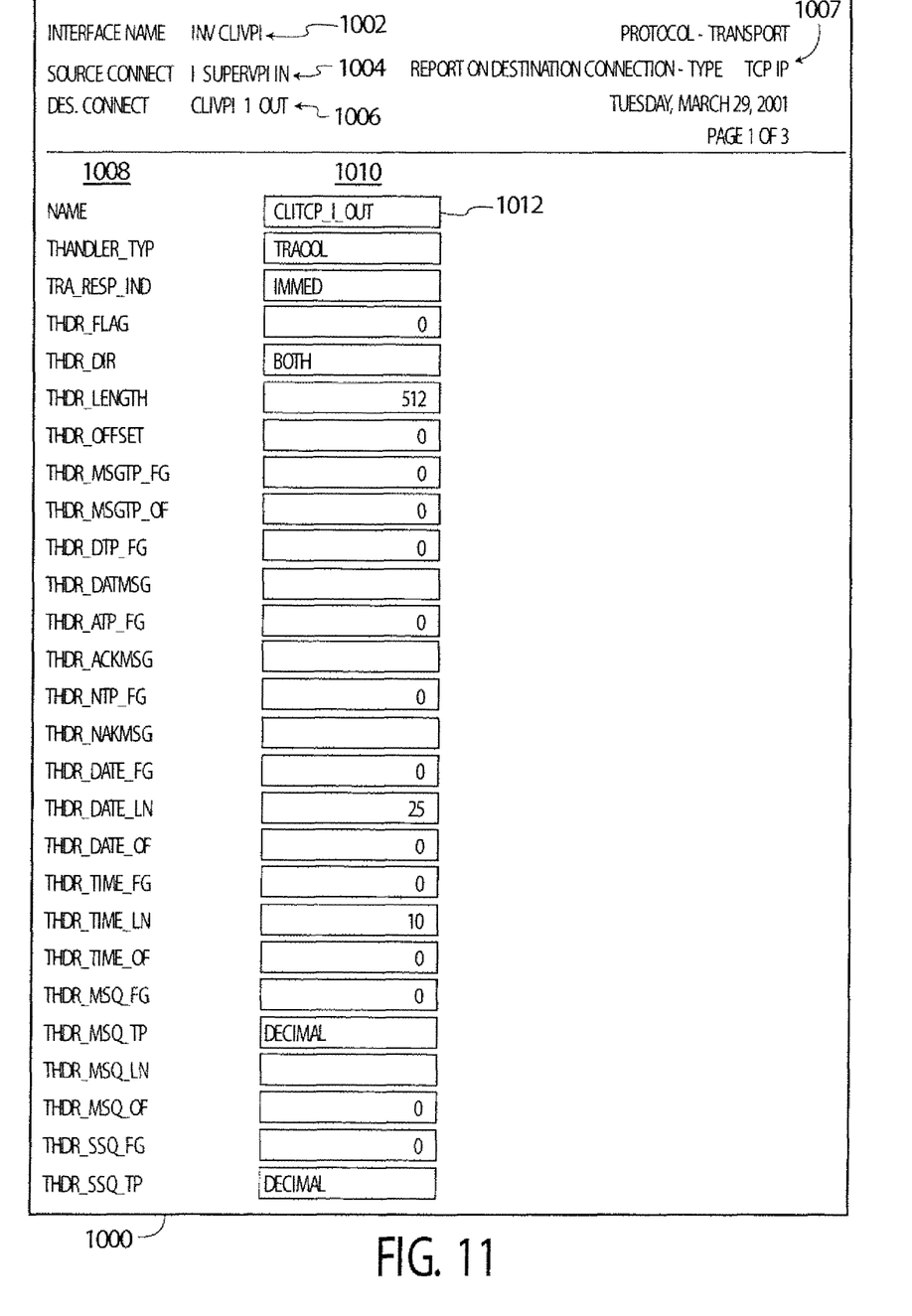

FIG. 11 illustrates a display 1000 of information relating the source protocol. In the heading, the names of the interface 1002; the source connection 1004; the destination connection 1006; and the protocol type 1007 are all displayed. In FIG. 11, the protocol is a TCP/IP protocol. The left hand column 1008 of FIG. 11 lists the property name, and the right column 1010 lists the values of the properties for the destination connection. The name of the protocol 1012 is displayed at the top of the right column 1012.

One skilled in the art will understand that the process described above is performed automatically. No data need be manually entered by a user. Instead, when user input is solicited, the user selects entries from a series of lists, checks boxes or radio buttons, or clicks buttons presented to him. In addition, no changes are made to the actual OPENLink database. Instead, only the image of the database is manipulated, although any changes made to the actual database are immediately reflected in the image database.

What is claimed is:

1. In a user interface system employed in retrieving information from an information repository used in exchanging data between different electronic data systems, a method comprising the steps of:

supporting user initiation of display of a first menu supporting user selection of a bi-directional communication interface from a plurality of different communication interfaces between electronic data systems employing incompatible communication interfaces having respective different data exchange communication characteristics, said bi-directional communication interface having data exchange communication characteristics enabling communicating data between a particular source using a first communication protocol and first data format and a particular destination using a different second communication protocol and second data format;

in response to user selection of said bi-directional communication interface, initiating display of a second menu supporting user entry of data determining data exchange communication characteristic information to be retrieved from said information repository for the selected communication interface and identifying a bi-directional communication protocol used by said selected communication interface; and supporting user initiation of a display of a third menu for retrieving information indicating connection properties of connections with said source and said destination and enabling user comparison of connection properties of connections with said source and said destination.

2. A method according to claim 1, wherein said third menu supports retrieval of at least one of, (i) data header information, (ii) transport protocol information, (iii) session information, and (iv) network information.

3. A method according to claim 1, wherein said communication characteristics to be retrieved concern at least one of, (a) connection attributes, (b) transmission configuration, (c) receiving configuration and (d) communication data format.

4. In a user interface system employed in retrieving information from an information repository used in exchanging data between different electronic data systems, a method comprising the steps of:

supporting user initiation of display of a first menu supporting user selection of a bi-directional communication interface from a plurality of different communication interfaces between electronic data systems employing incompatible communication interfaces having respective different data exchange communication characteristics, said bi-directional communication interface having data exchange communication characteristics enabling communicating data between a particular source using a first communication protocol and first data format and a particular destination using a different second communication protocol and second data format incompatible with at least one of, said first communication protocol and said first data format;

in response to user selection of said bi-directional communication interface, initiating display of one or more second image menus identifying a bi-directional communication protocol used by the selected communication interface and enabling retrieval of information concerning at least one of, (a) protocol characteristics, (b) interface characteristics and (c) connection characteristics; and supporting user initiation of a display of a third menu for retrieving information indicating connection properties of connections with said source and said destination and enabling user comparison of connection properties of connections with said source and said destination.

5. A method according to claim 4, wherein a menu for retrieving information concerning protocol characteristics supports retrieval of at least one of, (i)

data header information, (ii) transport protocol information, (iii) session information, and (iv) network information.

6. A method according to claim 4, wherein a menu for retrieving information concerning interface characteristics supports retrieval of at least one of, (i) interface port information, (ii) alternate protocol information, (iii) identification of inbound and outbound protocols and (iv) interface name.

7. A method according to claim 4, wherein a menu for retrieving information concerning connection characteristics supports retrieval of at least one of, (i) network node information, (ii) task name information, (iii) user identification information and (iv) synchronous or asynchronous characteristic definition.

8. In a user interface system supporting retrieval of information from an information repository used in exchanging data between different electronic data systems and including data elements individually associated with corresponding record identifiers, a method comprising the steps of:

supporting user initiation of display of a first menu supporting user entry of data identifying an information repository used in establishing a bi-directional communication interface between electronic data systems employing incompatible communication interfaces having data exchange communication characteristics enabling communicating data between a particular source using a first communication protocol and first data format and a particular destination using a different second communication protocol and second data format, to be parsed to identify data exchange characteristic related data elements in said information repository by identifying relationships between corresponding record identifiers associated with said data elements;

supporting user initiation of display of at least one second menu supporting user entry of data determining information to be retrieved from said information repository using sorting identifiers created and collated to indicate data exchange communication characteristic related data elements, in response to user entry of data identifying an information repository and identifying a bi-directional communication protocol used by a selected communication interface; and supporting user initiation of a display of a third menu for retrieving information indicating connection properties of connections with said source and said destination and enabling user comparison of connection properties of connections with said source and said destination.

9. A method according to claim 8, wherein
display of a second menu is initiated in response to user selection of an icon in said first menu.

10. A method according to claim 8, wherein
said information to be retrieved concerns at least one of, (a) an interface, (b) a protocol and (c) connection attributes.

11. In a user interface system employed in retrieving information from an information repository including data elements individually associated with corresponding record identifiers, said information repository being used in exchanging data between different electronic data, a method comprising the steps of:

supporting user initiation of display of a first menu showing source and destination communication characteristics of a bi-directional communication interface between electronic data systems employing incompatible communication interfaces having data exchange communication characteristics enabling communicating data between a particular source using a first communication protocol and first data format and a particular destination using a different second communication protocol and second data format including showing at least the first or second communication protocol type, said first menu supporting user entry of data identifying an information repository to be parsed to identify data exchange communication characteristic related data elements in said information repository by identifying relationships between corresponding record identifiers associated with said data elements;

supporting user initiation of display of at least one second menu supporting user entry of data determining information to be retrieved from said information repository using sorting identifiers created and collated to indicate related data elements in response to user entry of data identifying an information repository and identifying a bi-directional communication protocol used by a selected communication interface; and supporting user initiation of a display of a third menu for retrieving information indicating connection properties of connections with said source and said destination and enabling user comparison of connection properties of connections with said source and said destination.

12. A method according to claim 11, wherein
display of a second menu is initiated in response to user selection of an icon in said first menu and user entry of data identifying an information repository.

13. A method according to claim 11, wherein
said information to be retrieved concerns at least one of, (a) an interface, (b) a protocol, (c) a transaction and (d) connection attributes.

* * * * *